United States Patent
Mok et al.

(10) Patent No.: US 11,893,813 B2
(45) Date of Patent: Feb. 6, 2024

(54) ELECTRONIC DEVICE AND CONTROL METHOD THEREFOR

(71) Applicant: Samsung Electronics Co., Ltd., Suwon-si (KR)

(72) Inventors: Jeongho Mok, Suwon-si (KR); Heejun Song, Suwon-si (KR); Sanghyuk Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 17/294,594

(22) PCT Filed: Jan. 21, 2020

(86) PCT No.: PCT/KR2020/001029
§ 371 (c)(1),
(2) Date: May 17, 2021

(87) PCT Pub. No.: WO2020/159140
PCT Pub. Date: Aug. 6, 2020

(65) Prior Publication Data
US 2022/0012520 A1    Jan. 13, 2022

(30) Foreign Application Priority Data
Feb. 1, 2019    (KR) .................. 10-2019-0013965

(51) Int. Cl.
*G06V 30/148*    (2022.01)
*G06V 20/00*    (2022.01)
(Continued)

(52) U.S. Cl.
CPC ............. *G06V 30/153* (2022.01); *G06N 3/08* (2013.01); *G06V 20/00* (2022.01); *G10L 15/00* (2013.01); *G06V 30/10* (2022.01)

(58) Field of Classification Search
CPC ...... G06V 30/153; G06V 20/00; G06V 30/10; G10L 15/00
See application file for complete search history.

(56) References Cited

U.S. PATENT DOCUMENTS

| 7,729,917 B2 | 6/2010 | Miyamoto et al. |
| 7,747,434 B2 | 6/2010 | Flanagan et al. |

(Continued)

FOREIGN PATENT DOCUMENTS

| CN | 111968649 A | 11/2020 |
| JP | 2015-162244 A | 9/2015 |

(Continued)

OTHER PUBLICATIONS

Korean Office Action dated Apr. 9, 2021, issued in the International Application No. PCT/KR2020/001029.

*Primary Examiner* — Kevin Ky
(74) *Attorney, Agent, or Firm* — Jefferson IP Law, LLP

(57) ABSTRACT

An electronic device and a control method therefor are provided. The present electronic device comprises: a communication interface including a circuit, a memory for storing at least one instruction, and a processor for executing the at least one instruction, wherein the processor acquires contents through the communication interface, acquires information about a text included in an image of the contents, and acquires, on the basis of the information about the text included in the image of the contents, caption data of the contents by performing voice recognition for voice data included in the contents.

14 Claims, 15 Drawing Sheets

(51) Int. Cl.
*G10L 15/00* (2013.01)
*G06V 30/10* (2022.01)
*G06N 3/08* (2023.01)

(56) References Cited

U.S. PATENT DOCUMENTS

| | | | |
|---|---|---|---|
| 7,937,653 B2* | 5/2011 | Dejean | G06F 40/258 |
| | | | 715/251 |
| 8,543,395 B2 | 9/2013 | Todic | |
| 9,542,934 B2 | 1/2017 | Cooper et al. | |
| 9,684,479 B1* | 6/2017 | Block | H04N 1/50 |
| 9,922,095 B2 | 3/2018 | Koul et al. | |
| 10,304,458 B1* | 5/2019 | Woo | G10L 17/02 |
| 10,614,265 B2 | 4/2020 | Fume et al. | |
| 11,670,295 B2* | 6/2023 | Back | G06T 13/00 |
| | | | 704/232 |
| 2003/0053084 A1* | 3/2003 | Geidl | G06F 40/166 |
| | | | 358/1.6 |
| 2008/0270110 A1* | 10/2008 | Yurick | G06F 16/61 |
| | | | 704/3 |
| 2009/0110284 A1 | 4/2009 | Lamprecht et al. | |
| 2010/0114571 A1* | 5/2010 | Nagatomo | G06F 16/433 |
| | | | 704/235 |
| 2011/0218994 A1* | 9/2011 | Holladay | G06F 16/7844 |
| | | | 707/E17.054 |
| 2012/0300080 A1* | 11/2012 | Batson | H04N 21/23412 |
| | | | 348/E7.085 |
| 2013/0035827 A1* | 2/2013 | Breed | B60W 40/06 |
| | | | 701/45 |
| 2013/0346144 A1* | 12/2013 | Ferren | G06V 20/635 |
| | | | 705/7.29 |
| 2014/0324424 A1 | 10/2014 | Kim | |
| 2015/0082349 A1* | 3/2015 | Ishtiaq | H04N 21/4316 |
| | | | 725/40 |
| 2015/0088508 A1 | 3/2015 | Bharadwaj et al. | |
| 2015/0106842 A1 | 4/2015 | Lee | |
| 2015/0243276 A1 | 8/2015 | Cooper et al. | |
| 2016/0336008 A1* | 11/2016 | Menezes | G06F 40/295 |
| 2017/0154030 A1* | 6/2017 | Moorjani | G06F 3/167 |
| 2017/0308551 A1 | 10/2017 | Nomura | |
| 2018/0293440 A1* | 10/2018 | Kikin Gil | G06F 16/5866 |
| 2018/0366013 A1* | 12/2018 | Arvindam | G06F 40/237 |
| 2019/0215545 A1 | 7/2019 | Gupta et al. | |
| 2019/0287415 A1* | 9/2019 | Zavesky | G09B 7/00 |
| 2019/0294668 A1* | 9/2019 | Goel | H04N 21/4788 |
| 2019/0354601 A1* | 11/2019 | dePaz | G06F 3/167 |
| 2020/0050342 A1* | 2/2020 | Lee | G06F 17/16 |

FOREIGN PATENT DOCUMENTS

| | | |
|---|---|---|
| JP | 2017-167368 A | 9/2017 |
| KR | 10-2007-0067753 A | 6/2007 |
| KR | 10-1100191 B1 | 12/2011 |
| KR | 10-2013-0042493 A | 4/2013 |
| KR | 10-2013-0057338 A | 5/2013 |
| KR | 10-2015-0057591 A | 5/2015 |
| KR | 10-2018-0038318 A | 4/2018 |
| KR | 10-2018-0059030 A | 6/2018 |
| KR | 10-1996551 B1 | 7/2019 |

* cited by examiner

FIG. 1A

Why Bag of n-grams?

- Allow us to capture combination features in a simple way "don't love", "not the best"

- Works pretty well basically extracting bag of engrams features so despite

CNNs for Text
(Collobert and Weston 2011)

- 1D convolution = Time Delay Neural Network
  - But often uses terminology/functions borrowed from image processing
- Two main paradigms:
  - Context window modeling: For tagging. etx. get the surrounding context before tagging ④
  - Sentence modeling: Do convolution to extract n-grams pooling to combine over whole sentence

440

620

ELECTRONIC DEVICE AND CONTROL METHOD THEREFOR

TECHNICAL FIELD

The disclosure relates to an electronic device and a control method thereof, and more particularly to an electronic device generating caption data by performing speech recognition for speech data included in an image content and a control method thereof.

BACKGROUND ART

In recent years, artificial intelligence systems are used in various fields. The artificial intelligence system is a system in which a machine trains, determines, and becomes smarter by itself, unlike the rule-based smart system of the related art. As the artificial intelligence system is used, a recognition rate is improved and preferences of a user can be more accurately understood. Thus, the rule-based smart system of the related art is gradually being replaced with the deep learning-based artificial intelligence system.

The artificial intelligence technologies may include machine learning (e.g., deep learning) and elementary technologies using the machine learning.

The machine learning may refer, for example, to an algorithm technology of self-classifying/self-training features of input data, and the elementary technology may refer, for example, to a technology of simulating functions of the human brain such as recognition or determination using the machine learning algorithm such as the deep learning and includes technical fields of language understanding, visual understanding, inference/prediction, knowledge representation, operation control, and the like. In particular, the language understanding is a technology of recognizing languages/alphabets of human and applying/processing it and includes natural language processing, machine translation, a dialogue system, question and answer, speech recognition/synthesis, and the like.

Meanwhile, in recent years, there are various websites (e.g., Youtube™) providing image contents in a streaming method. In such websites, automatic speech recognition is performed for the image contents to generate caption data and the generated caption data is provided together with the image contents.

However, in recent years, it is disadvantageous that the speech recognition for the speech data of the image contents does not have a high accuracy. In particular, there is a problem that the accuracy of speech recognition gradually decreases in a case of image contents in which technical and specialized terms or proper nouns such as names of places or persons are frequently used.

Therefore, it is required to provide a method for performing more accurate speech recognition for speech data of image contents.

DISCLOSURE

Technical Problem

An object of the disclosure is to provide an electronic device for obtaining information on a text included in an image content by analyzing image data of the image content, and generating caption data by performing speech recognition for speech data of the image content based on the obtained information on the text, and a method for controlling the same.

Technical Solution

In accordance with an aspect of the disclosure, there is provided an electronic device including a communication interface comprising circuitry, a memory storing at least one instruction, and a processor configured to execute the at least one instruction, in which the processor is configured to obtain a content via the communication interface, obtain information on a text included in an image of the content, and obtain caption data of the content by performing speech recognition for speech data included in the content based on the information on the text included in the image of the content.

The processor may be configured to obtain the information on the text included in the image of the content through optical character reader (OCR) for image data included in the content.

The processor may be configured to perform the speech recognition for speech data corresponding to a first screen by applying a weight to a text included in the first screen while performing the speech recognition for the speech data corresponding to the first screen of the image of the content.

The processor may be configured to perform the speech recognition for the speech data by applying a high weight to a text with a long appearance time or a large number of times of appearance among texts included in the image of the content obtained by analyzing image data included in the content.

The processor may be configured to perform the speech recognition for the speech data by applying a high weight to a text displayed at a fixed position among texts included in the image of the content obtained by analyzing image data included in the content.

The processor may be configured to perform the speech recognition for the speech data by applying a weight based on at least one of an appearance position of the text and a size of the text included in the image of the content obtained by analyzing image data included in the content.

The processor may be configured to determine a type of the content by analyzing the content, and perform the speech recognition for the speech data by applying a weight to a text related to the determined type of the content.

The processor may be configured to determine the type of the content by analyzing metadata included in the content.

The processor may be configured to obtain information on the content by inputting image data included in the content to an artificial intelligence model trained for scene understanding and determine the type of the content based on the obtained information on the content.

In accordance with another aspect of the disclosure, there is provided a method for controlling an electronic device, the method including: obtaining a content; obtaining information on a text included in an image of the content; and obtaining caption data of the content by performing speech recognition for speech data included in the content based on the information on the text included in the image of the content.

The obtaining the information on the text may include obtaining the information on the text included in the image of the content through optical character reader (OCR) for image data included in the content.

The obtaining the caption data may include performing the speech recognition for speech data corresponding to a first screen by applying a weight to a text included in the first screen while performing the speech recognition for the speech data corresponding to the first screen of the image of the content.

The obtaining the caption data may include performing the speech recognition for the speech data by applying a high weight to a text with a long appearance time or a large number of times of appearance among texts included in the image of the content obtained by analyzing image data included in the content.

The obtaining the caption data may include performing the speech recognition for the speech data by applying a high weight to a text displayed at a fixed position among texts included in the image of the content obtained by analyzing image data included in the content.

The obtaining the caption data may include performing the speech recognition for the speech data by applying a weight based on at least one of an appearance position of the text and a size of the text included in the image of the content obtained by analyzing image data included in the content.

The obtaining the caption data may include: determining a type of the content by analyzing the content; and performing the speech recognition for the speech data by applying a weight to a text related to the determined type of the content.

The determining may include determining the type of the content by analyzing metadata included in the content.

The determining may include obtaining information on the content by inputting image data included in the content to an artificial intelligence model trained for scene understanding and determining the type of the content based on the obtained information on the content.

Effect of Invention

As described above, by performing the speech recognition by reflecting the text included in the image content when performing the speech recognition for the speech data of the image content, it is possible to perform more accurate speech recognition for the image content.

DESCRIPTION OF DRAWINGS

FIG. 1A is a diagram illustrating a speech recognition result for an image content of the related art;

FIG. 4C is a diagram illustrating a third screen of the image content according to an embodiment;

DETAILED DESCRIPTION OF EXEMPLARY EMBODIMENTS

Figure 1B:
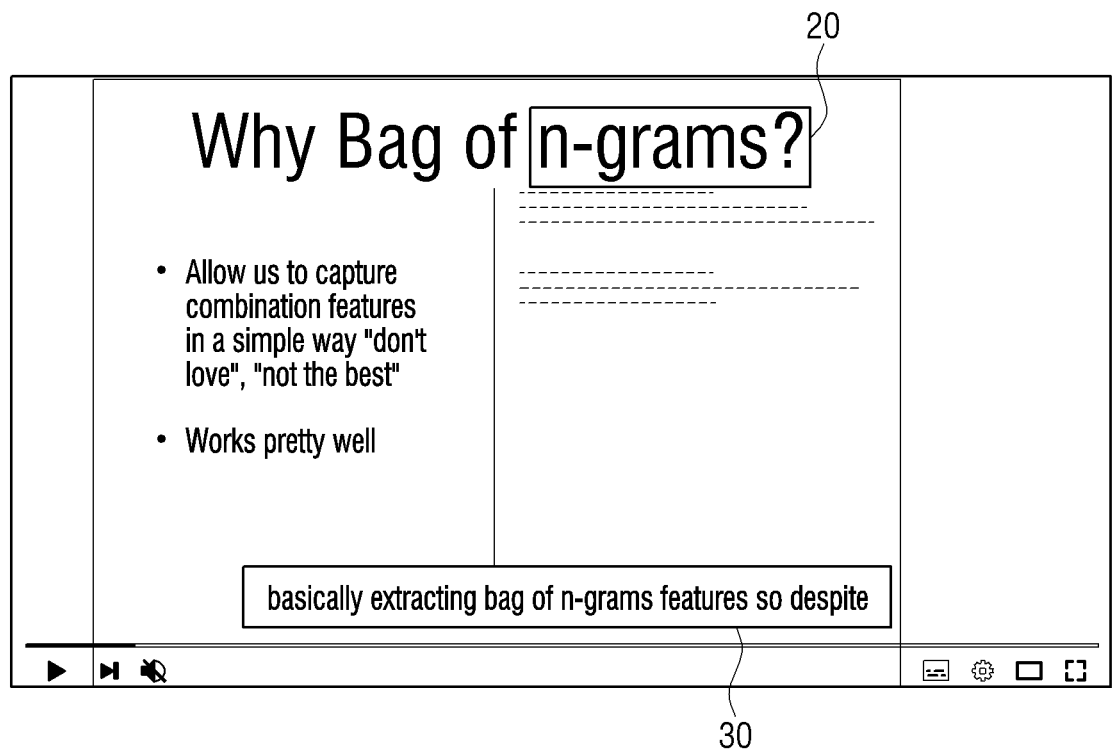
FIG. 1B is a diagram illustrating a speech recognition result for the image content according to an embodiment.

Hereinafter, various embodiments of the disclosure will be described with reference to the accompanying drawings. It should be noted that the technologies disclosed in this disclosure are not for limiting the scope of the disclosure to a specific embodiment, but they should be interpreted to include all modifications, equivalents and/or alternatives of the embodiments of the disclosure. In relation to explanation of the drawings, similar reference numerals may be used for similar elements.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the expression "configured to" does not necessarily refer to a device being "specifically designed to" in terms of hardware. Instead, under some circumstances, the expression "a device configured to" may refer to the device being "capable of" performing an operation together with another device or component. For example, the phrase "a unit or a processor configured (or set) to perform A, B, and C" may refer, for example, and without limitation, to a dedicated processor (e.g., an embedded processor) for performing the corresponding operations, a generic-purpose processor (e.g., a central processing unit (CPU) or an application processor), or the like, that can perform the corresponding operations by executing one or more software programs stored in a memory device.

The electronic device according to various embodiments of the disclosure may be implemented as a server for providing a web service, but this is merely an embodiment, and the electronic device may also be implemented as a user mobile terminal. For example, the electronic device may include at least one of, for example, a smartphone, a tablet personal computer (PC), a mobile phone, a video phone, an e-book reader, a desktop personal computer (PC), a laptop personal computer (PC), a netbook computer, a workstation, a server, a personal digital assistant (PDA), a portable multimedia player (PMP), an MP3 player, a mobile medical device, a camera, a wearable device, or the like. In some embodiments, the electronic device may include at least one of, for example, a television, a digital video disk (DVD) player, an audio system, a refrigerator, air-conditioner, a vacuum cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, an electronic frame, or the like.

In this disclosure, a term "user" may refer to a person using an electronic device or a device using an electronic device (e.g., an artificial intelligence electronic device).

Hereinafter, the disclosure will be described in detail with reference to the drawings. FIG. 1A is a diagram illustrating a speech recognition result for an image content of the related art. First, referring to FIG. 1A, in the related art, when performing speech recognition for an image content, the speech recognition for the image content has been performed regardless of a text included in a screen of the image content. Accordingly, in the related art, referring to FIG. 1A, "basically extracting bag of engrams features so despite" has been output as caption data 10 generated as a speech recognition result for a first screen of the image content. In other words, although "n-grams" is an accurate speech recognition result, a wrong speech recognition result "engrams" has been output as a result obtained by using a general language model.

FIG. 1B is a diagram illustrating a speech recognition result for the image content according to an embodiment.

First, an electronic device 100 may obtain an image content including image data and speech data. The image content may be a lecture content, but this is merely an embodiment, and the image content may be implemented as various contents such as a news content, a drama content, or a sports content.

The electronic device 100 may obtain information on texts included in an image of the image content by analyzing the image data of the image content. In an embodiment of the disclosure, the electronic device 100 may obtain the information on the text included in the image of the image content by using an optical character reader (OCR). In another embodiment, the electronic device 100 may obtain the information on the text included in the image of the image content by using an artificial intelligence model trained to recognize a text included in an image. The artificial intelligence model trained to recognize the text included in the image may be a convolutional neural network (CNN) model, but this is merely an embodiment, and the artificial intelligence model may be implemented as other artificial intelligence models.

The information on the text may be information such as an appearance frequency of the text, an appearance time of the text, an appearance position of the text, a size of the text, and movement of the text, but this is merely an embodiment, and the information may also include other information on text. For example, referring to FIG. 1B, the electronic device 100 may obtain information on the text "n-grams" 20 in the screen of the image content through analysis of the image data.

The electronic device 100 may obtain caption data by performing the speech recognition for the speech data of the image content based on the obtained information on the texts included in the image of the image content. In an example, the electronic device 100 may perform the speech recognition for the speech data of the image content by applying weights to texts obtained by inputting the speech data of the image content to an acoustic model and a language model based on the obtained information on the texts included in the image of the image content. In another example, the electronic device 100 may perform the speech recognition for the speech data of the image content by training a language model based on the obtained information on the texts included in the image of the image content and inputting the speech data of the image content to an acoustic model and the trained language model.

For example, the electronic device 100 may perform the speech recognition by applying a weight to the text "n-grams" 20 included in the screen of the image content or perform the speech recognition by training the language model based on the text (including "n-grams" 20) included in the screen of the image content, thereby obtaining cation data 30 that is "basically extracting bag of n-grams features so despite", referring to FIG. 1B.

The electronic device 100 may perform the speech recognition for speech data corresponding to the first screen by applying a weight to a text included in the first screen while performing the speech recognition for the speech data corresponding to the first screen of the image of the image content. In other words, when performing the speech recognition for the speech data, the electronic device 100 may perform the speech recognition for the speech data by applying a high weight to a text included in the image displayed while the speech data to be subjected to the speech recognition is output. In addition, the electronic device 100 may perform the speech recognition for speech data by applying a high weight to a text with a long appearance time or large number of times of appearance among the texts included in the image of the content obtained by analyzing the image data. In addition, the electronic device 100 may perform the speech recognition for speech data by applying a high weight to a text displayed at a fixed position among the texts included in the image of the content obtained by analyzing the image data. Further, the electronic device 100 may perform the speech recognition for speech data by applying a weight based on at least one of the appearance position of the text and the size of the text included in the image of the content obtained by analyzing the image content. For example, the electronic device 100 may perform the speech recognition for speech data by applying a high weight to a text of which the appearance position is an upper or lower center region of the screen or size is large.

In still another embodiment, the electronic device 100 may perform the speech recognition for speech data by determining a type of a content by analyzing the content and applying a weight to a text related to the determined type of the content. The electronic device 100 may determine the type of the content by analyzing metadata included in the content or obtain information on the content by inputting the image data to an artificial intelligence model trained for scene understanding and determine the type of the content based on the obtained information on the content. The artificial intelligence model trained for scene understanding may be a first model (e.g., convolutional neural network (CNN) model or the like) trained to obtain information on a plurality of objects included in an image by inputting the image data and a second model (e.g., recurrent neural network (RNN) or the like) trained to obtain text information for describing the plurality of objects, but this is merely an embodiment, and the artificial intelligence model may be implemented as other trained artificial intelligence models.

The electronic device 100 may perform the speech recognition by applying high weights to texts included in the type of the content based on the determined type of the content or training the language model based on the texts included in the type of the content.

Meanwhile, the electronic device 100 may use an artificial intelligence agent to obtain the information on the text included in the screen or understand the scene as described above. The artificial intelligence agent may be a dedicated program for providing artificial intelligence (AI)-based services (e.g., speech recognition service, assistant service, translation service, search service, and the like), and may be executed by a general-purpose processor (e.g., CPU) of the related art or a separate AI dedicated processor (e.g., GPU). In particular, the artificial intelligence agent may control various modules which will be described below (e.g., speech recognition system).

Figure 2:
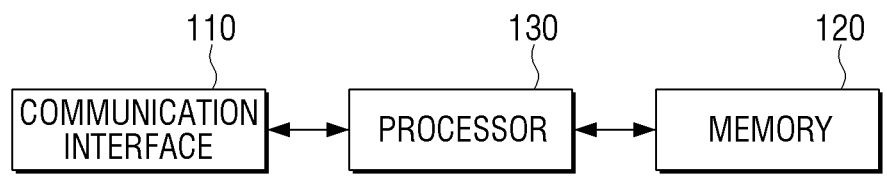
FIG. 2 is a diagram illustrating a configuration of an electronic device according to an embodiment.

FIG. 2 is a block diagram briefly illustrating a configuration of an electronic device according to an embodiment. Referring to FIG. 2, the electronic device 100 may include a communication interface 110, a memory 120, and a processor 130. However, there is no limitation to the above configuration and some constituent elements may be added or omitted according to the type of the electronic device. For example, if the electronic device is implemented as a user terminal, various constituent elements such as an input interface, a display, a speaker, a sensor and the like may be added to the electronic device 100.

The communication interface 110 may include circuitry and communicate with an external electronic device. Meanwhile, the communication connection of the communication interface 110 with the external device may include communication via a third device (e.g., a repeater, a hub, an access point, a server, a gateway, or the like). The wireless communication may include, for example, cellular communication using at least one of LTE, LTE Advanced (LTE-A), code division multiple access (CDMA), wideband CDMA (WCDMA), universal mobile telecommunications system (UMTS), Wireless Broadband (WiBro), or global system for mobile communications (GSM). According to an embodiment, the wireless communication may include, for example, at least one of wireless fidelity (Wi-Fi), Bluetooth, Bluetooth Low Energy (BLE), Zigbee, near field communication (NFC), magnetic secure transmission, radio frequency (RF), or body area network (BAN). The wired communication may include, for example, at least one of universal serial bus (USB), high definition multimedia interface (HDMI), recommended standard 232 (RS-232), power line communication, or plain old telephone service (POTS). The network for the wireless communication and the wired communication may include at least one of a telecommunication network, for example, a computer network (e.g., LAN or WAN), the Internet, or a telephone network.

In particular, the communication interface 110 may receive an image content including image data and speech data from an external device (user terminal device or external server). In addition, the communication interface 110 may transmit an image content including caption data obtained through the speech recognition in response to a request of an external device.

The memory 120 may store instructions or data related to at least another constituent element of the electronic device 100. In particular, the memory 120 may include a non-volatile memory, a volatile memory, a flash memory, a hard disk drive (HDD), or a solid-state drive (SSD). The memory 120 may be accessed by the processor 130 and reading, recording, editing, deleting, or updating of the data by the processor 130 may be executed. A term, memory, in the disclosure may include the memory 120, a ROM (not illustrated) and RAM (not illustrated) in the processor 130, or a memory card (not illustrated) (e.g., micro SD card or memory stick) mounted on the electronic device 100. In addition, the memory 120 may store programs and data for configuring various screens to be displayed in a display area of a display.

Figure 3A:
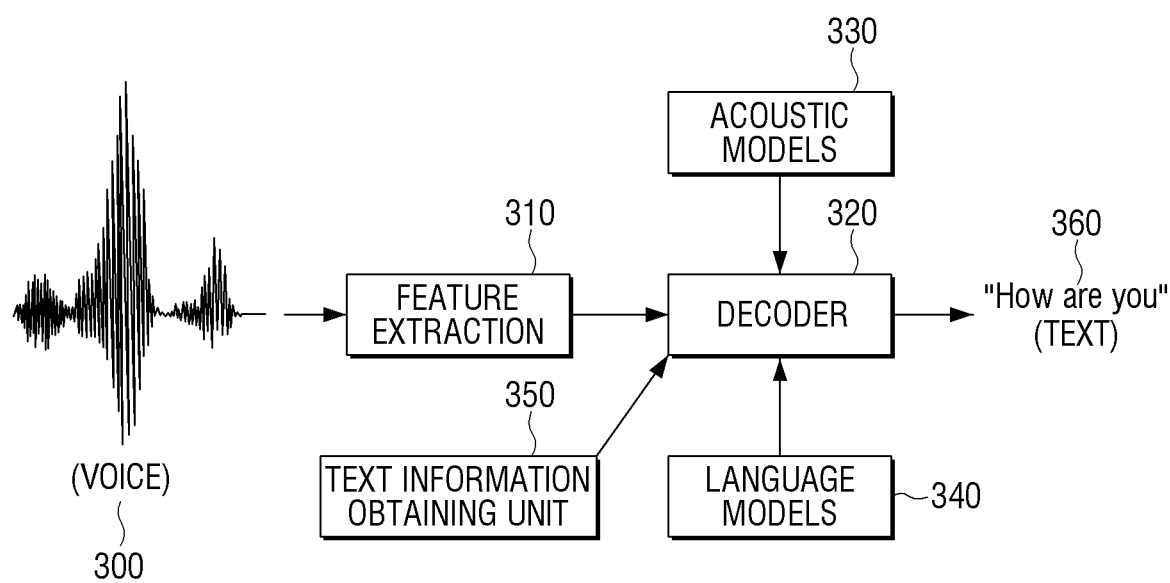
FIG. 3A is a diagram illustrating a configuration for performing speech recognition according to an embodiment.
Figure 3B:
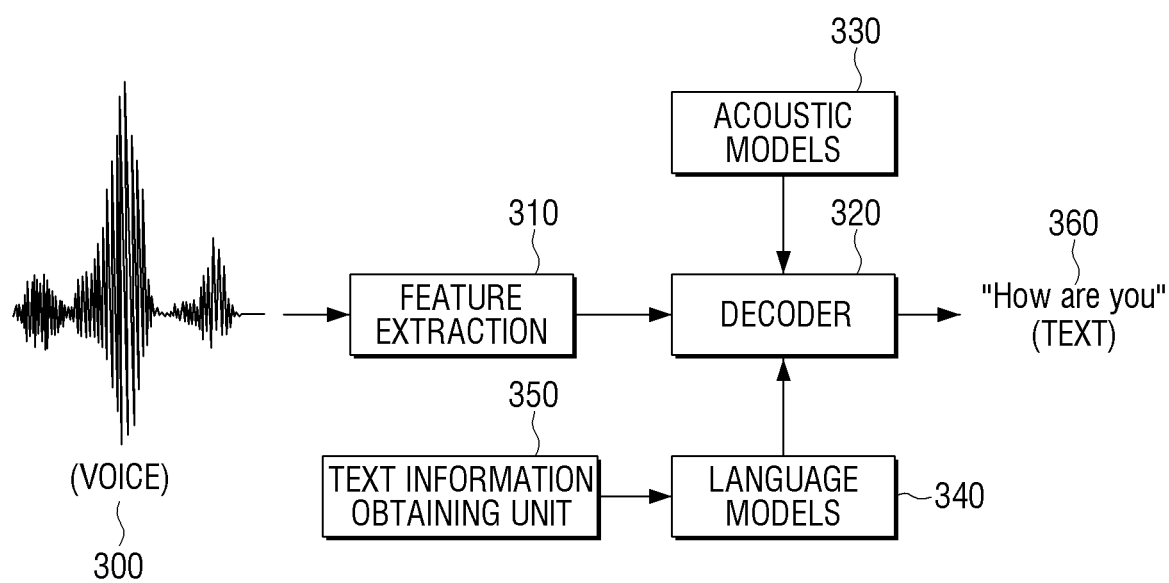
FIG. 3B is a diagram illustrating a configuration for performing speech recognition according to another embodiment.

In addition, the memory 120 may store an artificial intelligence agent for obtaining the information on the text included in the screen or understanding the scene. Further, the memory 120 may include a plurality of constituent elements (or modules) for recognizing user speech as illustrated in FIG. 3A or FIG. 3B. This will be described in detail with reference to FIGS. 3A and 3B.

The processor 130 may include one or more of a central processing unit (CPU), a microcontroller unit (MCU), a microprocessing unit (MPU), a controller, an application processor (AP), or a communication processor (CP), and an ARM processor for processing digital signals or may be defined as the corresponding term. In addition, the processor 130 may be implemented as System on Chip (SoC) or large scale integration (LSI) including the processing algorithm or may be implemented in form of a field programmable gate array (FPGA). The processor 130 may perform various functions by executing computer executable instructions stored in the memory 120. In addition, the processor 130 may include at least one of a graphics-processing unit (GPU), a neural processing unit (NPU), and a visual processing unit (VPU) as separate AI dedicated processor, in order to perform artificial intelligence functions.

In particular, the processor 130 may be electrically connected to the memory 120 to control general operations and functions of the electronic device 100. In particular, by executing at least one instruction stored in the memory 120, the processor 130 may obtain a content including image data and speech data via the communication interface 110, obtain information on a text included in an image of the content by analyzing the image data, and obtain caption data of the content by performing speech recognition for the speech data based on the information on the text included in the image of the content.

In particular, the processor 130 may obtain information on the text included in the image of the content through optical character reader (OCR) for the image data. In addition, the processor 130 may obtain the information on the text included in the image of the image content by inputting the image data of the image content to the trained artificial intelligence model.

Further, the processor 130 may perform the speech recognition by applying a weight to the text included in the image of the image content based on the information on the text included in the image of the image content. Specifically, the processor 130 may perform the speech recognition for the speech data corresponding to the first screen by applying a weight to a text included in the first screen while performing the speech recognition for the speech data corresponding to the first screen of the image of the content. The processor 130 may perform the speech recognition for the speech data by applying a high weight to a text with a long appearance time or large number of times of appearance among the texts included in the image of the content obtained by analyzing the image data. The processor 130 may perform the speech recognition for the speech data by applying a high weight to a text displayed at a fixed position among the texts included in the image of the content obtained by analyzing the image data. The processor 130 may perform the speech recognition for the speech data by applying a weight based on at least one of the appearance position of the text and the size of the text included in the image of the content obtained by analyzing the image content.

The processor 130 may not only perform the speech recognition based on the text included in the image of the content, but also perform the speech recognition for the speech data by determining a type of a content by analyzing the content and applying a weight to a text related to the determined type of the content. Specifically, the processor 130 may determine the type of the content by analyzing metadata included in the content. Alternatively, the processor 130 may obtain information on the content by inputting the image data to an artificial intelligence model trained for scene understanding and determine the type of the content based on the obtained information on the content. The processor 130 may perform the speech recognition for the speech data of the content by applying a weight to a text related to the determined type of the content or training the language model based on the text related to the determined type of the content.

FIG. 3A is a diagram illustrating a configuration for performing speech recognition according to an embodiment. First, the electronic device 100 may include a feature extraction unit 310, a decoder 320, an acoustic model 330, a language model 340, and a text information obtaining unit 350 to perform the speech recognition.

The feature extraction unit 310 may extract a feature from speech data of an input content. The feature extraction unit 310 may convert the speech data into a frequency domain and remove noise. The feature extraction unit 310 may extract a feature for the speech recognition by performing the speech processing from the speech data of the frequency domain from which noise is removed. The feature mainly used for the speech recognition may be LPC cepstrum, PLP cepstrum, Mel frequency cepstral coefficient (MFCC), filter bank energy, and the like.

The acoustic model 330 may be a model storing a representative pattern using an acoustic feature of a pronunciation for each phonological environment of a corresponding language as a probability model. The acoustic model is formed based on Hidden Markov Model (HMM) in a statistical and probabilistic method, but this is merely an embodiment, and there are various types of Hidden Markov Model/Deep Neural Network (HMM/DNN) method and the like.

The language model 340 may be a model constructed by collecting connectivity between words from text corpus by a statistical method so as to recognize a sentence uttered by a user as a correct sentence. The language model may be one of an N-gram language model, a neural language model, and a rule-based language model based on user feedback.

The text information obtaining unit 350 may obtain information on the text included in the image of the image content by analyzing the image data of the image content. The text information obtaining unit 350 may obtain the information on the text included in the image of the image content using the OCR and may obtain the information on the text included in the image of the image content using the trained artificial intelligence model. In particular, the text information obtaining unit 350 may obtain various pieces of information such as an appearance frequency, appearance time, an appearance position, movement, size, and the like of the text included in the image of the image content.

In addition, the text information obtaining unit 350 may obtain the information on the text related to the image content based on the type of the input image content. Specifically, the text information obtaining unit 350 may determine the type of the image content by analyzing metadata of the input image content or inputting the input image content to the trained recognition model. The text information obtaining unit 350 may obtain the information on the texts related to the determined type of the image content.

The decoder 320 may perform the speech recognition for the speech data using the acoustic model 330 and the language model 340, and output a text which is a result of the speech recognition performed. Specifically, the decoder 320 may obtain information on candidate texts corresponding to a feature of the speech data extracted by the feature extraction unit 310 through the acoustic model 330 and the language model 340. The decoder 320 may perform the speech recognition for the speech data by applying weights to candidate texts based on the information on the text included in the image of the image content obtained through the text information obtaining unit 350.

In other words, the decoder 320 may perform the speech recognition for the speech data by applying a high weight to the text included in the first screen while performing the speech recognition for the speech data corresponding to the first screen among the images of the content, applying a high weight to a text with long appearance time or a large number of times of appearance among the texts included in the image of the content obtained by analyzing the image data, applying a high weight to a text displayed at a fixed position among the texts included in the image of the content obtained by analyzing the image data, or applying a high weight to a text displayed at a specific position (e.g., lower center) among the texts included in the image of the content obtained by analyzing the image data.

The decoder 320 may perform the speech recognition for the speech data by applying weights to the candidate texts based on the information on the text related to the type of the image content obtained through the text information obtaining unit 350. In other words, the decoder 320 may perform the speech recognition for the speech data by applying a high weight to a text corresponding to the type of the image content based on the type of the image content currently displayed. For example, if the type of the content currently displayed is determined as a football content, the decoder 320 may perform the speech recognition for the speech data by applying a high weight to a text related to the football.

Meanwhile, referring to FIG. 3A, it is described that the decoder 320 performs the speech recognition by applying the weight to the text included in the image of the image content among the plurality of candidate texts based on the information on the text obtained through the text information obtaining unit 350, but this is merely an embodiment, and the decoder 320 may perform the speech recognition for the speech data through the language model 340 trained based on the information on the text included in the image of the image content obtained through the text information obtaining unit 350.

Specifically, referring to FIG. 3B, the text information obtaining unit 350 may output the information on the text included in the image of the image content or the information on the text related to the type of the image content to the language model 340. The language model 340 may be trained based on the obtained information on the text. In other words, the language model 340 may be trained so that a statistical probability of the text included in the image of the image content or the text related to the type of the image content increases based on the obtained information on the text. The decoder 320 may obtain the text corresponding to the feature of the speech data extracted by the feature extraction unit 310 by using the acoustic model 330 and the trained language model 340.

Meanwhile, in FIGS. 3A and 3B, it is described that the acoustic model and the language model are provided as separate models, but this is merely an embodiment, and the technical spirit of the disclosure may also be applied to an embodiment in which the acoustic model and the language model are integrated as one neural network model.

Figure 4A:
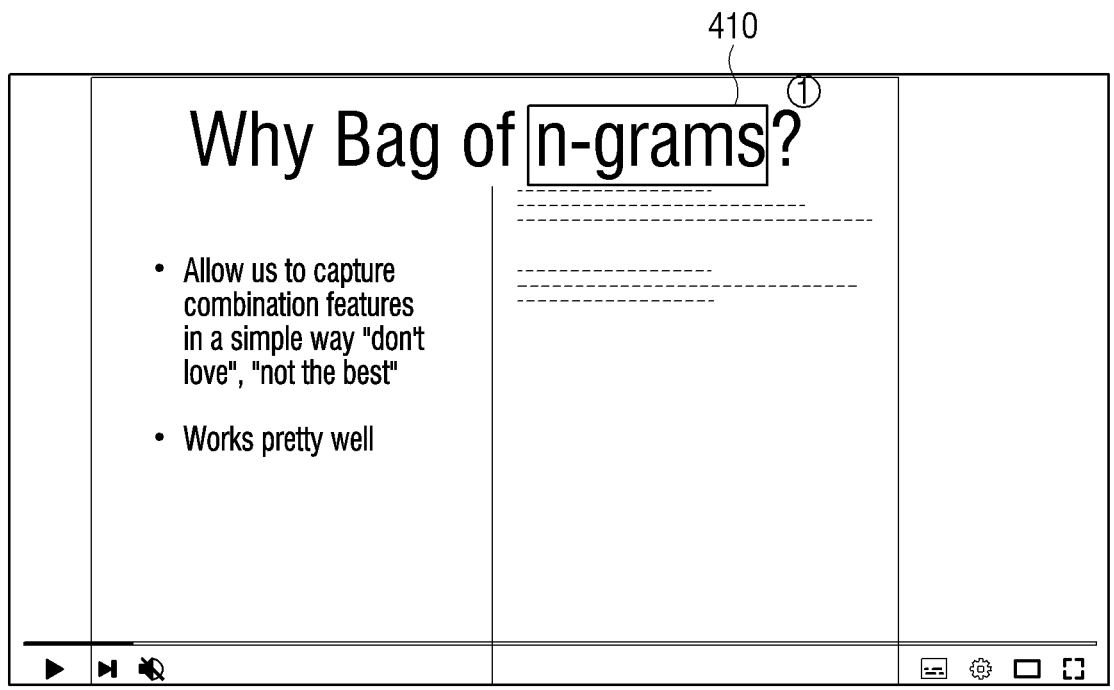
FIG. 4A is a diagram illustrating a first screen of the image content according to an embodiment.
Figure 4B:
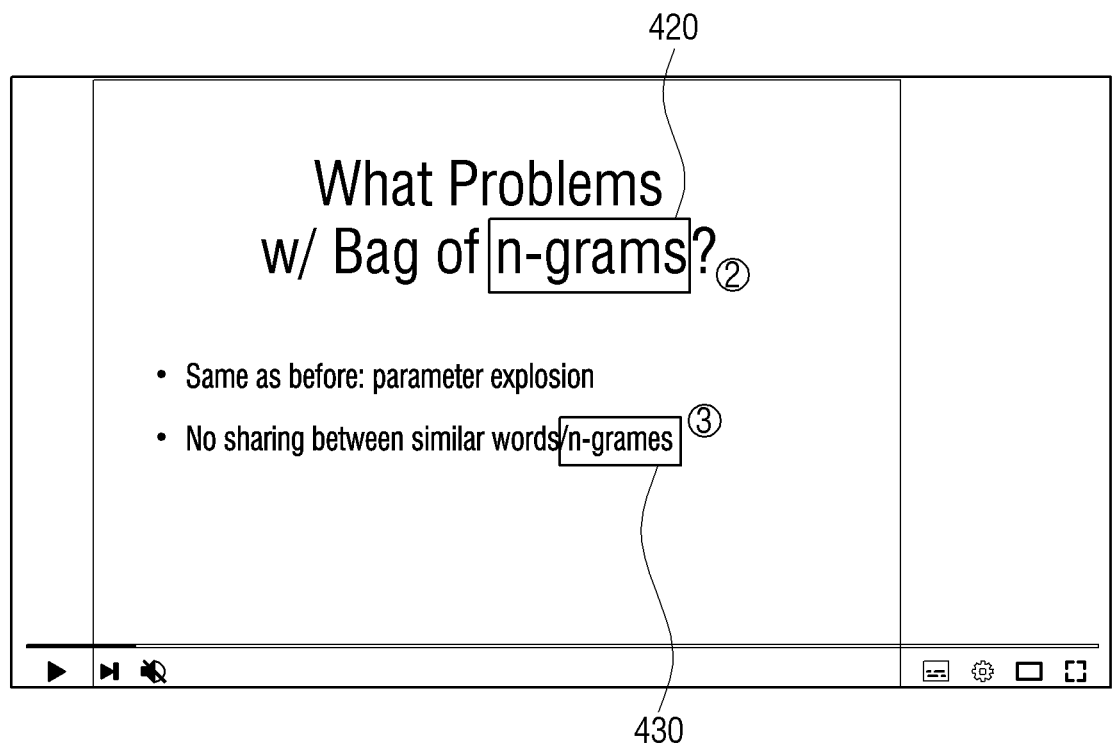
FIG. 4B is a diagram illustrating a second screen of the image content according to an embodiment.

FIGS. 4A to 4C are diagrams illustrating first to third screens of a lecture content according to an embodiment. In particular, FIG. 4A may be a screen provided at 7 min. 16 sec. of the lecture content, FIG. 4B may be a screen provided at 10 min. 54 sec. of the lecture content, and FIG. 4C may be a screen provided at 17 min. 28 sec. of the lecture content.

The electronic device 100 may obtain information on a text included in the lecture content by analyzing image data of the lecture content. For example, referring to FIG. 4A, the electronic device 100 may obtain information on a text n-grams 410 in the first screen of the lecture content, referring to FIG. 4B, the electronic device 100 may obtain information on texts n-grams 420 and 430 in the second screen of the lecture content, and referring to FIG. 4C, the electronic device 100 may obtain information on a text n-grams 440 in the third screen of the lecture content. The information on the text may include at least one of appearance time, appearance duration time, an appearance frequency, an appearance position, and a size of the corresponding text. Meanwhile, for convenience of description, it is described using a word "n-grams" included in the lecture content as an example, and information on other texts may also be obtained.

In other words, the electronic device 100 may perform the speech recognition for the speech data of the lecture content based on the information on the text "n-grams" included in the lecture content.

In particular, when performing the speech recognition of the speech data provided while the first screen of the lecture content is displayed, the electronic device 100 may perform the speech recognition by applying a high weight to a text (e.g., n-grams 410) included in the first screen.

In addition, the electronic device 100 may perform the speech recognition by applying a weight based on the appearance frequency and the appearance time of the text included in the lecture content. For example, if the word "n-grams" appears in the lecture content four times and the appearance time is approximately 3 minutes, the electronic device 100 may perform the speech recognition by applying the weight to correspond to the appearance frequency and the appearance time of "n-grams".

The electronic device 100 may perform the speech recognition by applying the weight based on the appearance position of the text or the size of the text included in the lecture content. For example, if the position of the word "n-grams" is positioned at an upper portion of the first screen of the lecture content and a text size is 30, the electronic device 100 may perform the speech recognition by applying the weight so as to correspond to the appearance position and the size of "n-grams".

Meanwhile, the information on "n-grams" included in the first screen shown in FIG. 4A is not only used for recognizing the speech data corresponding to the first screen, but may also be used for recognizing the speech data included in other screens (e.g., second screen and third screen). In other words, when recognizing the speech data included in the first screen, referring to FIGS. 4A to 4C, the information on the text included in the first to third screens may be used. Although the first screen does not include "n-grams", when recognizing the speech data corresponding to the first screen, the information on the text included in the second and third screens may be used.

In particular, when recognizing the speech data output while a specific screen is displayed, different weights may be applied based on time when the text is output, size/thickness of the text, and the like. For example, the weights may be set to be high in the order of the "n-grams" 410 of the first screen, the "n-grams" 420 and 430 of the second screen, and the "n-grams" 440 of the third screen which is the order of the texts closer to the display time of the first screen while the first screen is displayed. The higher weight may be set for the "n-grams" 410 of the first screen and the "n-grams" 420 of the second screen which are written larger and thicker than the "n-grams" 430 of the second screen and the "n-grams" 440 of the third screen. In other words, when performing the speech recognition for the speech data output while the first screen is displayed, the weight may be set high in the order of the "n-grams" 410, the "n-grams" 420, the "n-grams" 430, and the "n-grams" 440.

Meanwhile, in the above embodiment, it is described that the weight is applied based on the appearance frequency, the number of times of appearance, the appearance position, and the size of the text, but this is merely an embodiment, and the weight may be applied based on the other information on the text. For example, the electronic device 100 may perform the speech recognition by applying the weight to the text based on movement of the text or a display method of the text (e.g., thickness of the text, underline of the text, color of the text, and the like).

Accordingly, as described above, by applying the weight to the text included in the image of the lecture content, it is possible to prevent erroneous recognition of "n-grams" as "engrams", when performing the speech recognition for the speech data of the lecture content.

Hereinafter, an embodiment of applying the weight based on the information on the text included in the image of various image contents according to various embodiments of the disclosure will be described with reference to FIGS. 5A, 5B, 6A, and 6B.

Figure 5A:
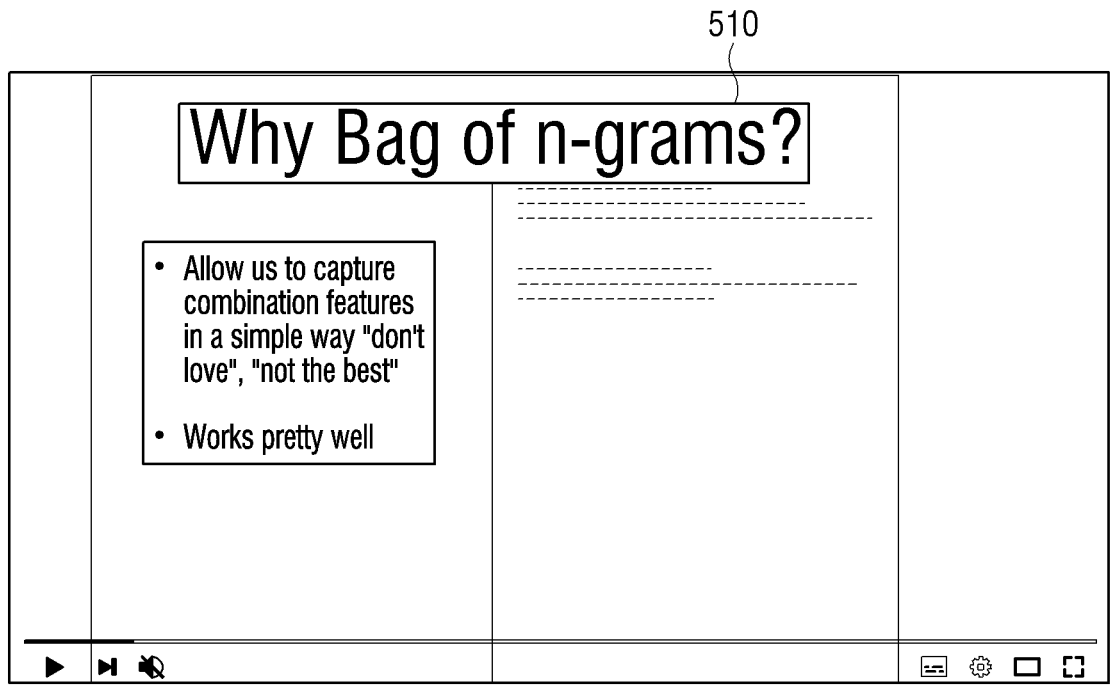
FIG. 5A is a diagram illustrating a screen of a lecture content according to an embodiment.

FIG. 5A is a diagram illustrating a screen of a lecture content according to an embodiment. Referring to FIG. 5A, a higher weight may be applied to a text "Why Bag of n-grams?" 510 which is positioned at an upper portion of the screen, occupies a large area, and has a larger text size than other texts in a content included in an image of the lecture content, compared to other texts which are positioned at a middle or lower portion of the screen and have smaller text size.

Figure 5B:
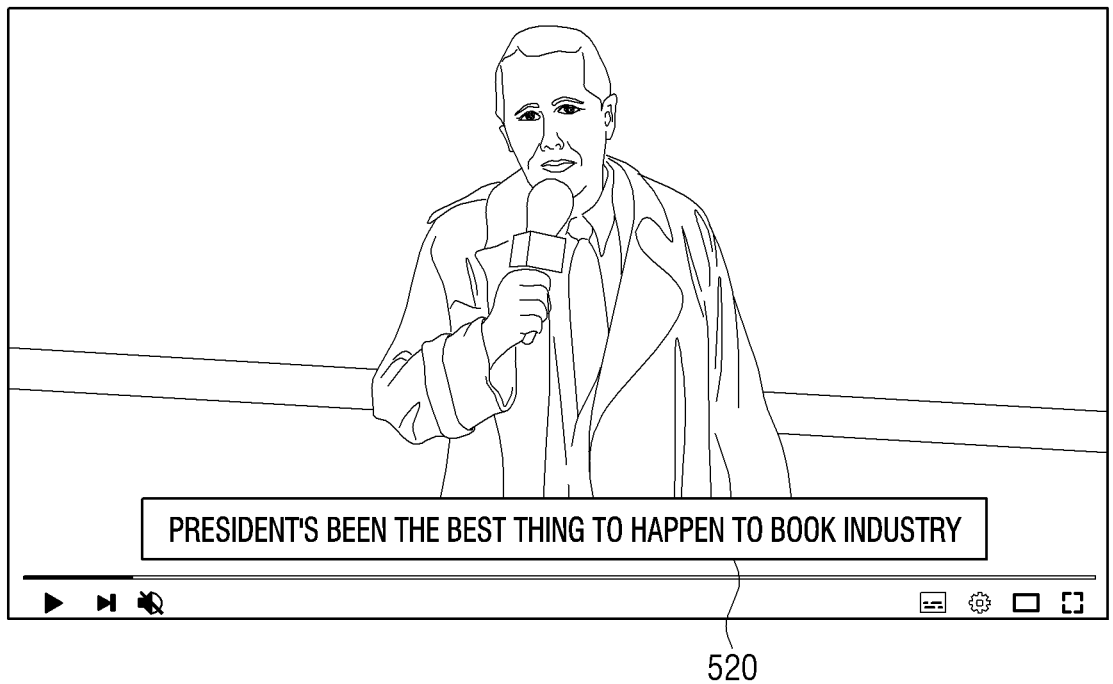
FIG. 5B is a diagram illustrating a screen of a news content according to an embodiment.

FIG. 5B is a diagram illustrating a screen of a news content according to an embodiment. Referring to FIG. 5A, a higher weight may be applied to a text "PRESIDENT'S BEEN THE BEST THING TO HAPPEN TO BOOK INDUSTRY" 520 which is positioned at a lower portion of the screen and has long appearance duration time in a content included in an image of the news content, compared to other texts which are positioned at other portions of the screen and have short duration time.

Figure 6A:
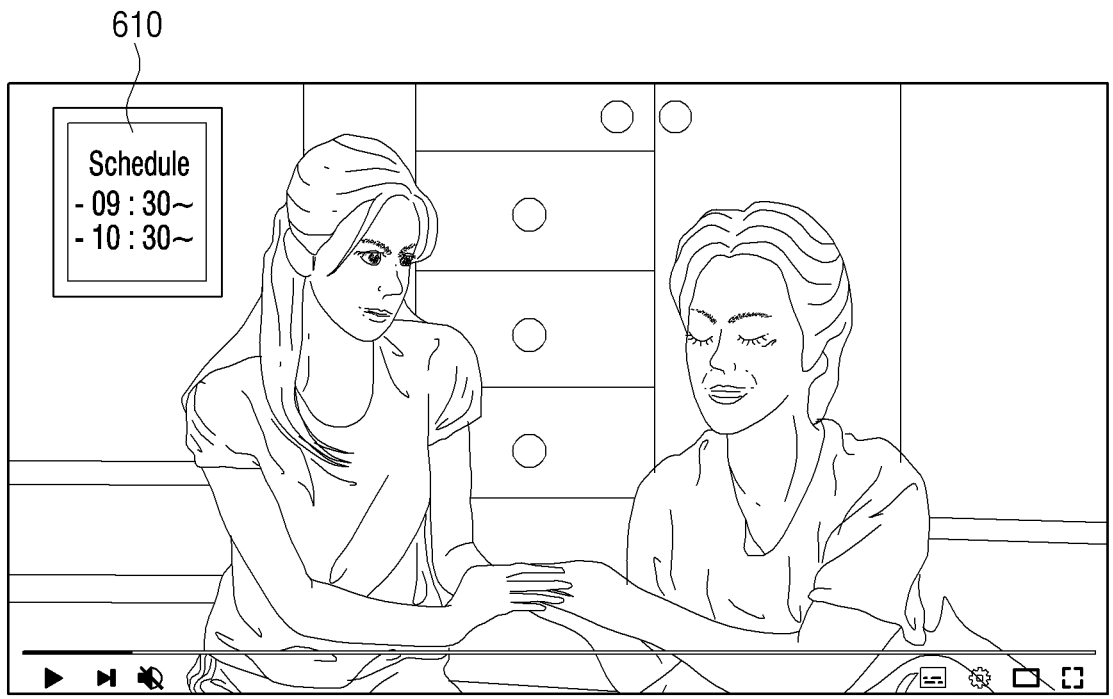
FIG. 6A is a diagram illustrating a screen of a drama content according to an embodiment.

FIG. 6A is a diagram illustrating a screen of a drama content according to an embodiment. Referring to FIG. 6A, among texts included in the drama content, a low weight may be applied to a text 610, the position of which is not fixed due to movement of a camera and which is included in a background that passes temporarily.

Figure 6B:
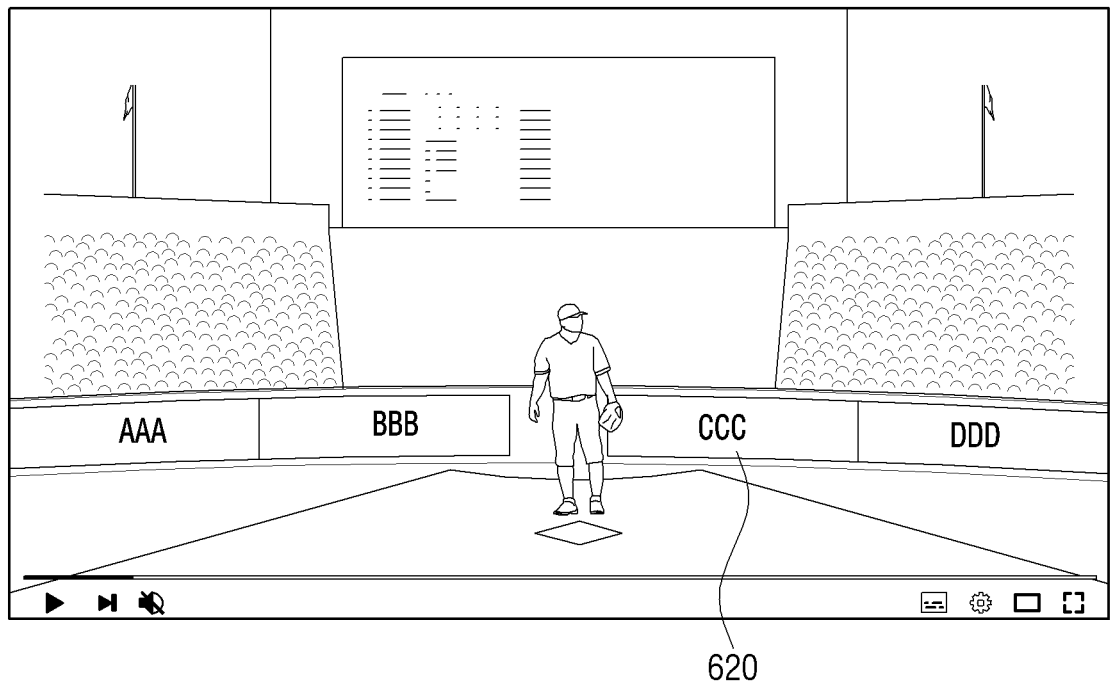
FIG. 6B is a diagram illustrating a screen of a sports content according to an embodiment.

In addition, FIG. 6B is a diagram illustrating a screen of a sports content according to an embodiment. Referring to FIG. 6B, among texts included in the sports content, a low weight may be applied to an advertisement text 620, the position of which is not fixed due to movement of a camera and which is included in a background that passes temporarily.

In other words, as described above with reference to FIGS. 5A, 5B, 6A, and 6B, the electronic device 100 may differently apply the weight to the text included in the screen of the image content based on the size, the appearance position, the movement, the appearance duration time, and the like of the text included in the screen of the image content.

Figure 7:
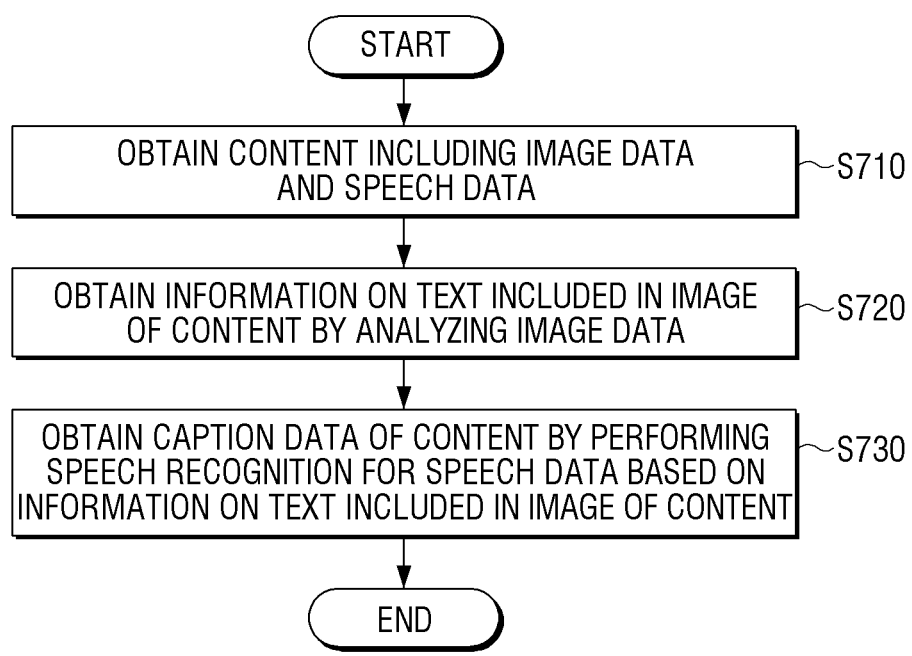
FIG. 7 is a flowchart illustrating a method for controlling the electronic device according to an embodiment.

FIG. 7 is a flowchart illustrating a method for controlling the electronic device according to an embodiment.

First, the electronic device 100 may obtain a content including image data and speech data (S710). The electronic device 100 may receive the content from an external device, but this is merely an embodiment, and the electronic device 100 may obtain the content including the image data and the speech data through an internal camera.

The electronic device 100 may obtain information on a text included in the image of the content by analyzing the image data (S720). Specifically, the electronic device 100 may perform the OCR with respect to the image data of the content to obtain the information on the text included in the image of the content. Alternatively, the electronic device 100 may obtain the information on the text included in the image of the content by inputting the image data of the content to the trained artificial intelligence model.

The electronic device 100 may obtain caption data by performing the speech recognition for the speech data based on the information on the text included in the image of the content (S730). Specifically, the electronic device 100 may perform the speech recognition for the speech data by applying a high weight to the text included in the image of the content based on the information on the text included in the image of the content. In particular, the electronic device 100 may perform the speech recognition for the speech data by applying the weight based on the appearance time, the appearance position, the appearance duration time, the size, the movement, and the like of the text included in the image of the content. In another example, the electronic device 100 may train the language model based on the information on the text included in the image of the content and perform the speech recognition for the speech data using the trained language model. The electronic device 100 may generate text data obtained through the speech recognition as caption data and output the caption data in response to a user request or a request of an external electronic device.

Figure 8:
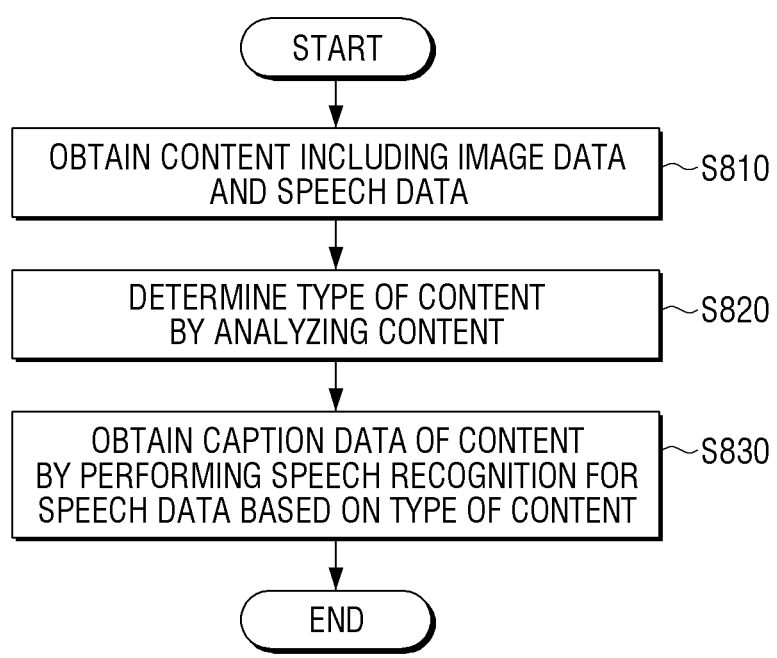
FIG. 8 is a flowchart illustrating a method for controlling the electronic device according to another embodiment.

FIG. 8 is a flowchart illustrating a method for controlling the electronic device according to another embodiment.

First, the electronic device 100 may obtain a content including image data and speech data (S810).

The electronic device 100 may determine a type of the content by analyzing the content (S820). Specifically, the electronic device 100 may determine the type of the content based on metadata of the content or determine the type of the content by inputting the image data to an artificial intelligence model trained for scene understanding.

The electronic device 100 may obtain caption data of the content by performing speech recognition for the speech data based on the type of the content (S830). Specifically, the electronic device 100 may perform the speech recognition for the speech data of the content by applying the weight to the text related to the type of the content. In another example, the electronic device 100 may train the language model based on the text related to the type of the content and perform the speech recognition for the speech data using the trained language model. The electronic device 100 may generate text data obtained through the speech recognition as caption data and output the caption data in response to a user request or a request of an external electronic device.

Meanwhile, in the above embodiment, it is described by assuming that the speech data and the caption data are in the same language, but this is merely an embodiment, and the technical sprit of the disclosure may also be applied, if the speech data and the caption data are in different languages.

Specifically, if a language type of the caption data to be obtained is the same as a language type of the text included in the screen and different from a language type of the speech data included in the content, the electronic device 100 may obtain text data in a first language by recognizing the speech data included in the content, and translate the text data in the first language into caption data in a second language based on the text data in the first language and a text in the second language included in the screen. For example, if the speech data included in the content is in English, a text included in the image is in Korean, and Korean caption data is to be obtained, the electronic device 100 may obtain English text data by recognizing the speech data, and translate the English text data into Korean caption data based on the English text data and a Korean text included in the screen and provide the Korean caption data.

In other words, if the text included in the screen and the speech data are different from each other, the electronic device 100 may not use the text data included in the screen when performing the speech recognition, since the languages are different from each other. In some cases, the electronic device 100 may not perform image processing to obtain the text included in the screen, if the text included in the screen and the speech data are different from each other.

In addition, if the text included in the screen and the speech data are different from each other, the electronic device 100 may use the text in the image when performing the translation.

Further, if the text included in the screen and the speech data are different from each other, the electronic device 100 may store one text in various languages when obtaining the text included in the screen. For example, if the text included in the screen is in English, the electronic device 100 may store the English text in Korean, Japanese, and Chinese with the same meaning. The languages stored in various forms may be used when translating the text later.

Meanwhile, if the language type of the caption data to be obtained is different from the language type of the text included in the screen and the language type of the speech data included in the content, the electronic device 100 may perform the speech recognition based on the speech data in the first language included in the content and the text in the first language included in the screen, and obtain caption data in the second language by translating the text data in the first language subjected to the speech recognition. For example, if the speech data included in the content is in English, the text included in the image is in English, and Korean caption data is to be obtained, the electronic device 100 may obtain English text data by recognizing the speech data based on the speech data and the text included in the screen, and obtain the Korean caption data by translating the English text data.

Figure 9:
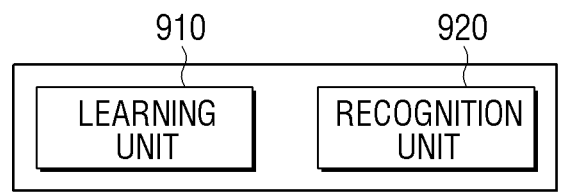
FIG. 9 is a block diagram illustrating a configuration of the electronic device for training and using a recognition model according to an embodiment.

FIG. 9 is a block diagram illustrating a configuration of the electronic device (particularly, processor) for training and using a recognition model according to an embodiment. Referring to FIG. 9, the electronic device 100 may include at least one of a learning unit 910 and a recognition unit 920.

The learning unit 910 may generate or train a recognition model for obtaining the information on the text included in the image of the image content and a recognition model for scene understanding. The learning unit 910 may generate a recognition model having a determination criterion by using collected training data.

In an example, the learning unit 910 may generate, train, or update an artificial intelligence model for determining a criterion for obtaining the information on the text included in the image of the image content by using the image data including the text as the training data.

In another example, the learning unit 910 may generate, train, or update an artificial intelligence model for determining a criterion for performing the scene understanding by using the image data as the training data.

The recognition unit 920 may predict a recognition target or a situation included in predetermined data by using the predetermined data as input data of the trained recognition model.

In an example, the recognition unit 920 may obtain (or predict, infer) the information on the text included in the image of the image content by using the image data including the text as input data of the trained artificial intelligence model.

In another example, the recognition unit 920 may obtain (or predict, infer) the information on a screen of the image data by applying the image data to the trained artificial intelligence model.

At least a part of the learning unit 910 and at least a part of the recognition unit 920 may be implemented as software modules or may be manufactured as at least one hardware chip and mounted on the electronic device. For example, at least one of the learning unit 910 and the recognition unit 920 may be manufactured in a form of a dedicated hardware chip for artificial intelligence (AI) and may be manufactured as a part of a generic-purpose processor (e.g., CPU or application processor) of the related art or a graphic dedicated processor (e.g., GPU) and mounted on various electronic devices or object recognition devices described above. The dedicated hardware chip for artificial intelligence is a dedicated processor specialized in probability calculation and may rapidly process the calculation operations in the artificial intelligence field such as machine learning with higher performance of parallel processing than the generic-purpose processor of the related art. If the learning unit 910 and the recognition unit 920 are implemented as software module (or program module including instructions), the software module may be stored in a non-transitory computer readable medium. In this case, the software module may be provided by an operating system (O/S) or provided by a predetermined application. In addition, a part of the software module may be provided by the operating system (O/S) and the other part thereof may be provided by the predetermined application.

In this case, the learning unit 910 and the recognition unit 920 may be mounted on one electronic device or may be mounted on separate electronic devices, respectively. For example, one of the learning unit 910 and the recognition unit 920 may be included in the electronic device 100 and the other one thereof may be included in an external device (e.g., external server). In addition, the learning unit 910 and the recognition unit 920 may be connected in a wired or wireless manner so that model information constructed by the learning unit 910 may be provided to the recognition unit 920 and the data input to the recognition unit 920 may be provided to the learning unit 910 as additional training data. Further, at least one of the learning unit 910 and the recognition unit 920 may be implemented in a form of distributed processing by a plurality of devices. For example, at least one of the learning unit 910 and the recognition unit 920 may be distributed, processed, and stored by a plurality of devices through a server, a distribution storage medium, a distributed processing server, and the like. In addition, the electronic device 100 may include only the recognition unit 920. The electronic device 100 may receive an artificial intelligence model for text recognition trained through the learning unit 910 provided in another device and recognize the text included in the image of the content based on the received artificial intelligence model.

In this disclosure, the term "unit" or "module" may include a unit implemented with hardware, software, or firmware and may be interchangeably used with terms, for example, logic, logic blocks, parts, or circuits. The "unit" or the "module" may be a part integrally formed or a minimum unit or a part of the part performing one or more functions. For example, the module may be implemented as an application-specific integrated circuit (ASIC).

Various embodiments of the disclosure may be implemented as software including instructions stored in machine (e.g., computer)-readable storage media. The machine is a device which invokes instructions stored in the storage medium and is operated according to the invoked instructions, and may include an electronic device (e.g., electronic device 100) according to the disclosed embodiments. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

What is claimed is:

1. An electronic device comprising:
a communication interface comprising circuitry;
a memory storing at least one instruction; and
a processor configured to execute the at least one instruction,
wherein the processor is configured to:
obtain a content via the communication interface,
obtain information on a text included in an image of the content,
obtain caption data of the content by performing speech recognition for speech data included in the content based on the information on the text included in the image of the content, and
perform the speech recognition for the speech data by applying a weight to each of an appearance time of the text, an appearance position of the text and a size of the text included in the image of the content obtained by analyzing image data included in the content.

2. The device of claim 1, wherein the processor is further configured to obtain the information on the text included in the image of the content through optical character reader (OCR) for image data included in the content.

3. The device of claim 1, wherein the processor is further configured to perform the speech recognition for speech data corresponding to a first screen by applying a weight to a text included in the first screen while performing the speech recognition for the speech data corresponding to the first screen of the image of the content.

4. The device of claim 1, wherein the processor is further configured to perform the speech recognition for the speech data by applying a high weight to a text with a long appearance time or a large number of times of appearance among texts included in the image of the content obtained by analyzing image data included in the content.

5. The device of claim 1, wherein the processor is further configured to perform the speech recognition for the speech data by applying a high weight to a text displayed at a fixed position among texts included in the image of the content obtained by analyzing image data included in the content.

6. The device of claim 1, wherein the processor is further configured to:
determine a type of the content by analyzing the content, and
perform the speech recognition for the speech data by applying a weight to a text related to the determined type of the content.

7. The device of claim 6, wherein the processor is further configured to determine the type of the content by analyzing metadata included in the content.

8. The device of claim 6, wherein the processor is further configured to:
obtain information on the content by inputting image data included in the content to an artificial intelligence model trained for scene understanding, and
determine the type of the content based on the obtained information on the content.

9. A method for controlling an electronic device, the method comprising:
obtaining a content;
obtaining information on a text included in an image of the content; and
obtaining caption data of the content by performing speech recognition for speech data included in the content based on the information on the text included in the image of the content,
wherein the obtaining of the caption data comprises:
performing the speech recognition for the speech data by applying a weight to each of an appearance time of the text, an appearance position of the text and a size of the text included in the image of the content obtained by analyzing image data included in the content.

10. The method of claim 9, wherein the obtaining of the information on the text comprises obtaining the information on the text included in the image of the content through optical character reader (OCR) for image data included in the content.

11. The method of claim 9, wherein the obtaining of the caption data comprises performing the speech recognition for speech data corresponding to a first screen by applying a weight to a text included in the first screen while performing the speech recognition for the speech data corresponding to the first screen of the image of the content.

12. The method of claim 9, wherein the obtaining of the caption data comprises performing the speech recognition for the speech data by applying a high weight to a text with a long appearance time or a large number of times of appearance among texts included in the image of the content obtained by analyzing image data included in the content.

13. The method of claim 9, wherein the obtaining of the caption data comprises performing the speech recognition for the speech data by applying a high weight to a text displayed at a fixed position among texts included in the image of the content obtained by analyzing image data included in the content.

14. The method of claim 9, wherein the obtaining of the caption data comprises performing the speech recognition for the speech data by applying a weight based on at least one of an appearance position of the text and a size of the text included in the image of the content obtained by analyzing image data included in the content.

* * * * *